(12) United States Patent
Kundig

(10) Patent No.: US 7,191,923 B1
(45) Date of Patent: Mar. 20, 2007

(54) PORTABLE EQUIPMENT SUPPORT

(76) Inventor: Jim L. Kundig, 10960 Bluffside Dr. #202, Studio City, CA (US) 91604

(*) Notice: Subject to any disclaimer, the term of this patent is extended or adjusted under 35 U.S.C. 154(b) by 257 days.

(21) Appl. No.: 10/360,026

(22) Filed: Feb. 7, 2003

Related U.S. Application Data

(60) Provisional application No. 60/364,611, filed on Mar. 18, 2002.

(51) Int. Cl.
G03B 17/56 (2006.01)
(52) U.S. Cl. .................. 224/257; 352/243; 248/187.1; 396/423; 396/420
(58) Field of Classification Search ............... 224/257, 224/185; 352/243; 396/423, 425, 428; D16/242; 248/187.1
See application file for complete search history.

(56) References Cited

U.S. PATENT DOCUMENTS

| | | | | |
|---|---|---|---|---|
| 2,636,822 A | * | 4/1953 | Anderson | 224/185 |
| 2,771,826 A | * | 11/1956 | Shapiro | 224/257 |
| 4,208,028 A | * | 6/1980 | Brown et al. | 224/185 |
| 4,327,986 A | * | 5/1982 | Carter | 396/423 |
| RE32,213 E | * | 7/1986 | Brown | 352/243 |
| 4,687,309 A | * | 8/1987 | Breslau | 396/423 |
| 4,763,151 A | * | 8/1988 | Klinger | 396/419 |
| 5,454,042 A | * | 9/1995 | Drever | 381/362 |
| 6,705,578 B2 | * | 3/2004 | Mulford et al. | 248/187.1 |

* cited by examiner

Primary Examiner—Tri M. Mai
(74) Attorney, Agent, or Firm—David S. Nagy

(57) ABSTRACT

An articulated equipment support includes a pair of elongated support bars, arranged in fixed, spaced-apart relationship, and having their opposite ends joined respectively by a top cross rod and a bottom cross rod. Pivot pins join the opposite ends of the rods to the respective cross bars permitting pivotal, lateral movement of the support bars in unison so that a variety of geometric configurations such as a parallelogram or the like may be achieved. The top cross rod includes an end projection having a bearing surface for rotatably mounting a double C-clamp with an outwardly projecting flange terminating with a bearing for rotatably supporting an equipment platform. An adjustable lock is carried on the platform for releasably securing equipment thereto and a shoulder strap is provided having opposite ends attached to the bottom cross bar and an adjustable mid-section trained across or about the torso of the user.

10 Claims, 2 Drawing Sheets

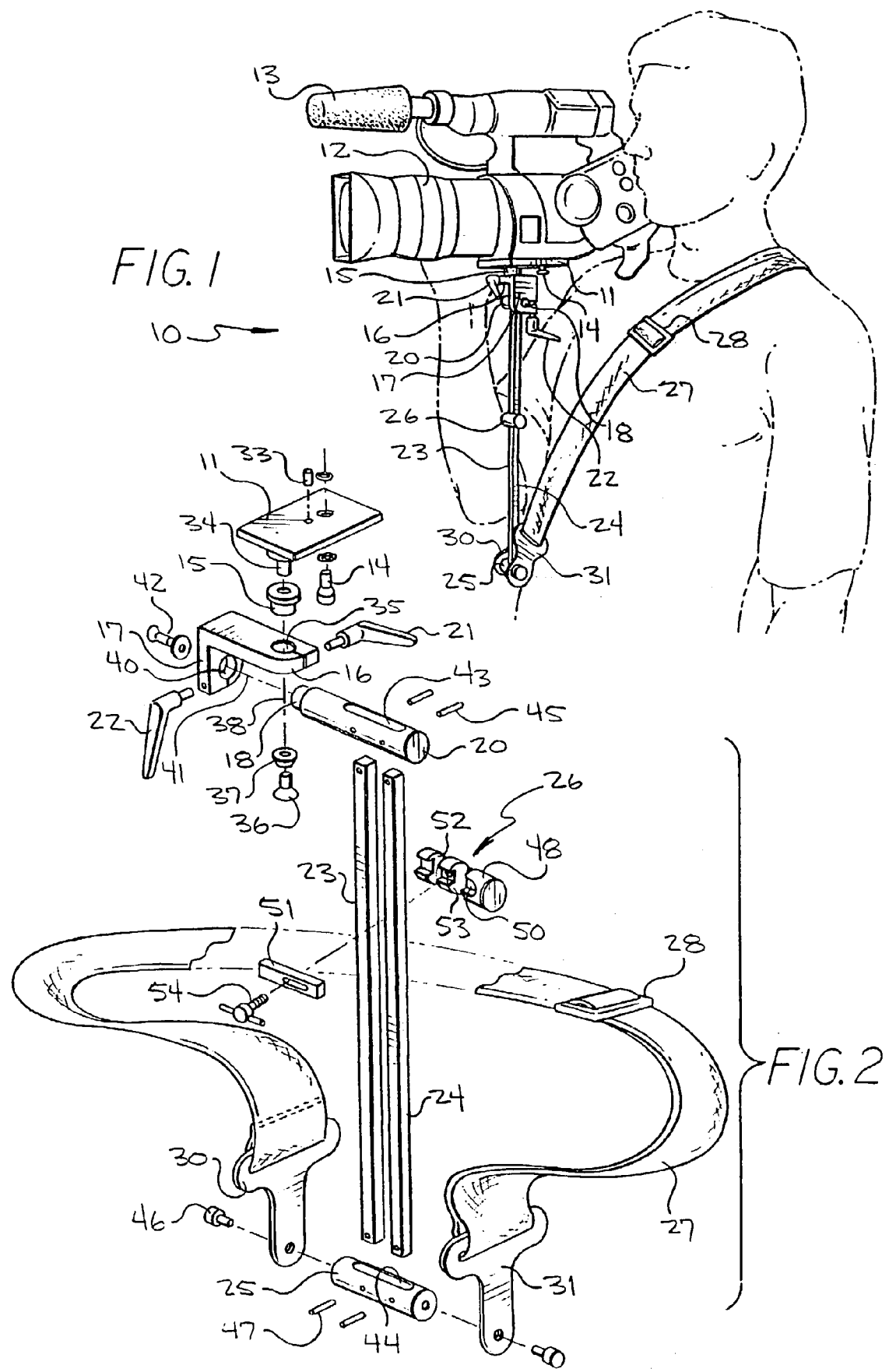

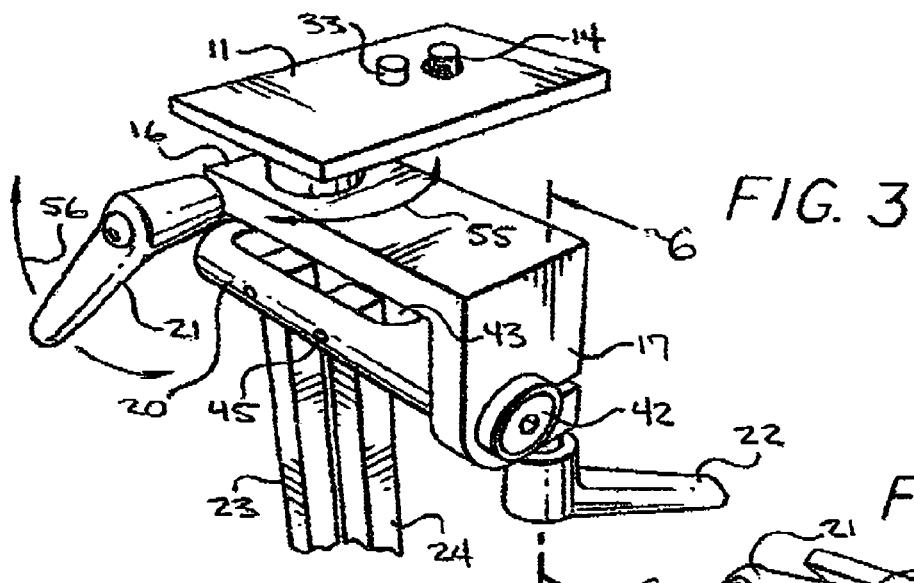
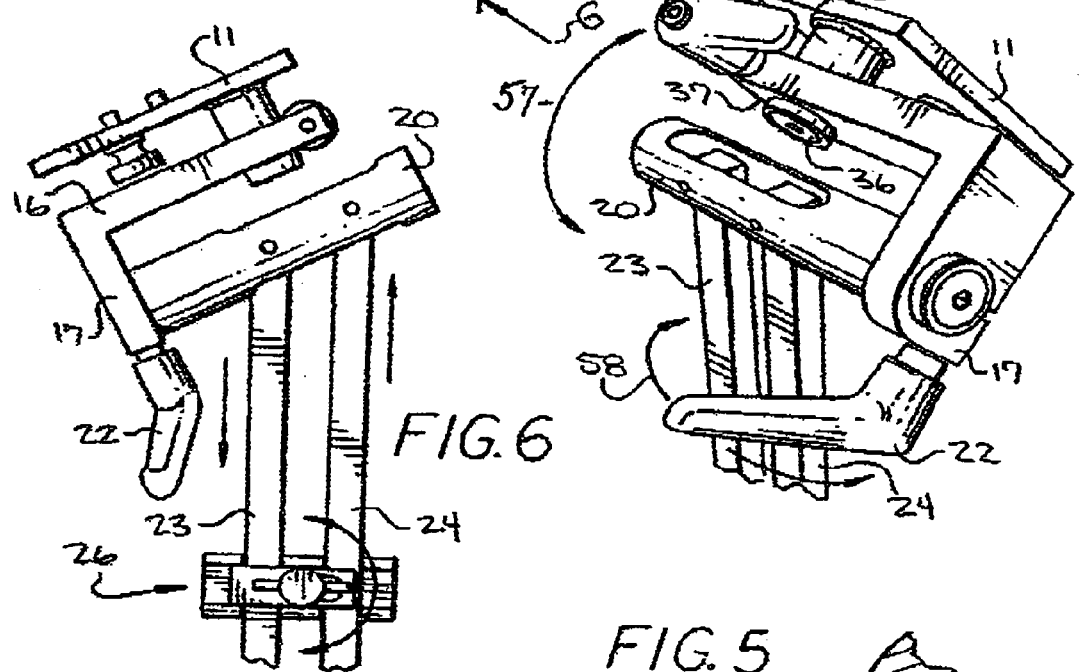
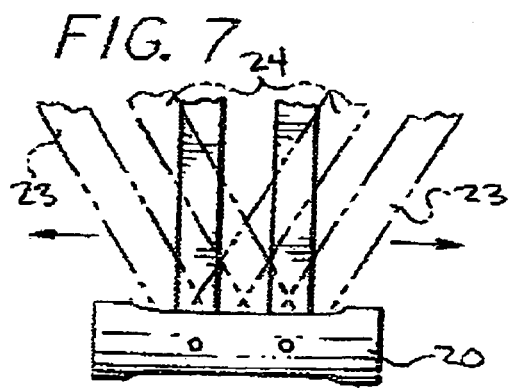
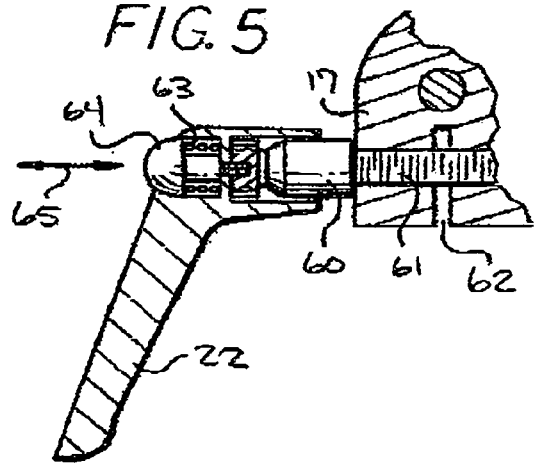

PORTABLE EQUIPMENT SUPPORT

Priority Claimed based on Ser. No. 60/364,611 filed Mar. 18, 2002

BACKGROUND OF THE INVENTION

1. Field of the Invention

The present invention relates to the field of equipment supports intended to be worn on the body of the user, and more particularly to a novel fully articulated equipment support adapted to be carried on the user's torso whereby the equipment may be supported readily positionable between desired locations in front of the user while the equipment is being operated.

2. Brief Description of the Prior Art

In the past, it has been the conventional practice for equipment operators, such as cameramen who support and hold hand-held cameras, recorders or the like, to operate the equipment simultaneously with manual support of the equipment. This, of course, is somewhat awkward and requires considerable dexterity on the part of the operator or cameraman and further requires additional concentration which detracts from the main objective of operating the equipment. Furthermore, the weight of modern cameras, sound recording equipment and the like, further taxes the energies and concentration of the equipment operator.

Some attempts have been made to provide a strap arrangement for supporting the equipment on the body of the user; however, problems and difficulties have been encountered with such prior conventional straps which stem largely from the fact that attachment of the equipment to be operated onto the strap is awkward and is not always in a proper location for operation by the camera man or operator. Also, even though the equipment is supported on a conventional strap, the operator must use both hands to either support the equipment or at least one hand to support the equipment while the other hand is operating the controls for the equipment. Conventional supports for such hand-held equipment are awkward and it is difficult for the operator to simultaneously support and operate the equipment due to weight, geometry of the equipment housing, etc.

Therefore, a long-standing need has existed to provide a portable equipment support which can be carried on the torso of the user and which is fully articulated so that the equipment can be positioned and re-positioned conveniently at the discretion of the user. The support should include pivot or rotating means for moving components of the device into various orientations while the equipment is being operated or wherein the user can set the equipment in pre-selected locations for fixed operation of the equipment.

SUMMARY OF THE INVENTION

Accordingly, the above problems and difficulties are avoided by the present invention which provides a fully articulated equipment support that is adapted to be carried on the torso of the user, and whereby the equipment may be readily positioned while supported between desired locations in front of the user and simultaneously while the equipment is being operated. The equipment is held on the support providing hands-free support or single-hand support of the equipment during the operating procedure.

The novel equipment support includes a pair of elongated support bars, arranged in fixed, spaced-apart relationship, and having their opposite ends joined respectively by a top cross rod and a bottom cross rod. Pivot pins join the opposite ends of the rods to the respective cross bars permitting pivotal, lateral movement of the support bars in unison so that a variety of geometric configurations such as a parallelogram or the like may be achieved. The top cross rod includes an end projection having a bearing surface for rotatably mounting a double C-clamp with an outwardly projecting flange terminating with a bearing for rotatably supporting an equipment platform. Means are carried on the platform for releasably securing equipment thereto and a shoulder strap is provided having opposite ends attached to the bottom cross bar and an adjustable mid-section trained across or about the torso of the user.

Therefore, it is among the primary objects of the present invention to provide a portable equipment support for equipment that may be fully supported and readily positionable by the user while the equipment is being simultaneously operated.

Another object of the present invention is to provide a novel portable support for equipment such as a camera, audio recording equipment or the like, which is carried on a platform adapted to be fully articulated so as to be readily positionable by the user into a variety of locations while being supported from the user's torso.

Yet another object of the present invention is to provide a fully articulated support for equipment that provides convenience for the user to simultaneously position and operate the equipment while supported from a shoulder and torso strap.

Yet a further object resides in providing a fully articulated means for supporting a hand-held video camera or the like while allowing freedom of movement and which provides a stable platform for hand-held operation and which provides more controlled movement during operation that is available with conventional hand-holding procedures.

Still a further object is to provide an articulated support for hand-held equipment which provides relief for the user's arm and shoulder during long periods of use.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view illustrating hand-held equipment being supported on the fully articulated support incorporating the present invention;

FIG. 2 is an enlarged, exploded perspective view illustrating the components of the fully articulated support shown in FIG. 1;

FIG. 3 is a front perspective view, greatly enlarged, illustrating the rotational movements of the equipment platform and the double C-clamp assembly used in the embodiment shown in FIGS. 1 and 2;

FIG. 4 is a view similar to the view of FIG. 3 illustrating the platform and C-clamp assembly pivoted into an alternative position from that shown in FIG. 3;

FIG. 5 is a fragmentary, cross-sectional view of the clamp as taken in the direction of arrows 6—6 of FIG. 3;

FIG. 6 is a front elevational view of the equipment support illustrating pivoting of the support bars arranged in a parallelogram configuration;

FIG. 7 is a diagrammatic view of the support bars illustrating the pivoting action of the parallelogram arrangement in different position from that shown in FIG. 6;

DESCRIPTION OF PREFERRED EMBODIMENT

Referring in detail to FIG. 1, the novel equipment support of the present invention is illustrated in the general direction of arrow 10, which includes an equipment support platform 11 on which equipment such as a camera 12 and audio recording equipment 13 is carried. A fastening screw 14 releasably secures equipment such as the camera 12 onto the surface of the platform 11. The platform 11 is adapted to pivot on a shaft mounted in bearing 15 which is carried on a flange 16 of a double C-clamp 17. The double C-clamp is adapted to rotate about a horizontal axis by means of a bearing 18 carried on the end of an upper or top cross member 20. A securement handle 21 is operably connected between the double C-clamp and the platform for releasably securing the platform in a selected position about a vertical axis. A similar handle 22 is employed for releasably maintaining the platform in a position about a horizontal axis when the double C-clamp is rotated on bearing 18.

A pair of elongated support bars 23 and 24 have their opposite ends connected respectively to the cross member 20 and a lower or bottom cross member 25. The support bars are arranged in spaced-apart parallel relationship, and when the platform 11 requires positioning, the support bars can be pivoted since they form a parallelogram with pivot connections into the respective cross members. A locking device 26 is employed for securing the parallel support bars in a fixed location after positioning.

A torso and shoulder strap 27 is employed for supporting the weight of the equipment on the shoulder and torso of the user. An adjustment buckle 28 may be employed for providing proper fitting of the strap onto the user, and the strap includes terminating ends in strap connectors 30 and 31 which are pivotally coupled to the opposite ends of the lower cross member 25.

Referring now in detail to FIG. 2, it can be seen that the platform 11 further includes an alignment pin 33 which is fixed to the upper surface of the platform and is intended to be placed into a mating slot or opening on the underside of the equipment, such as the camera 12. Once the equipment has been properly aligned and located on the platform, fastening screw 14 is tightened into a threaded opening on the underside of the equipment for releasable securement. The underside of the platform includes a shaft 34 mounted in bearing 15 which rotates in hole 35 when released by the flange 16 of the double C-clamp 17 under control of the handle 21.

It is further indicated in FIG. 2 that the bearing 18 is inserted into opening 40 for rotation on the C-clamp 17 when bearing 15 is released by the handle 22. Rotation of the double C-clamp is about a horizontal axis 41 when so released, and this in turn permits the platform to be positioned to a desired orientation by the user. The end of cross member 20 is operably attached to the double C-clamp by means of a screw and washer arrangement 42.

It can also be seen in FIG. 2 that the opposite ends of the support bars 23 and 24 are insertably received within slots 43 and 44 respectively in the cross members 20 and 25. A pair of pins, such as pin 45, hold the end of the support rods and pivoting relationship to the respective cross members. Therefore, the cross bars can be moved laterally in either direction since a parallelogram is formed. The ends of strap 27 are pivotally attached to the opposite ends of the cross bar 25 by means of screws, such as screw 46, which pass through openings in the respective connectors 30 and 31. The lower end of the support bars 23 and 24 are secured in a pivoting manner within slot 44 of cross member 25 by pins, such as pin 47.

A lock mechanism is illustrated in the direction of arrow 26 which includes a cylindrical barrel 48 having a slot 50 formed therein for receiving a bar 51. The slot 50 is horizontal while a pair of slots 52 and 53 are employed for receiving the support bars 23 and 24 respectively. When the bars are placed within the slot 52 and 53, and the bar 51 is placed in slot 50, a threaded fastener 54 is used to releasably secure the bar in position against the support bars 23 and 24 to compress the cylindrical barrel 48 against the backside thereof. This forms a lock so that any lateral movement of the respective support bars 23 and 24 is prevented.

Referring to FIGS. 3 and 4, it can be seen that the connection of the ends of the support bars 23 and 24 with cross member 20 as well as the double C-clamp 16 and 17 provides a universal joint for fully articulating the position of the equipment platform 11. When the handle 21 is relaxed or released, the platform can be pivoted about a vertical axis in the direction of arrow 55. The final position of the platform is secured by rotating handle 21 in the direction of arrow 56. In FIG. 4, the platform 11 is rotated about a horizontal axis in the direction of arrows 57 when the handle 22 is moved in the direction of arrow 58 to either loosen or lock the C-clamp 17 onto the end of the cross member 20.

In FIG. 5, the handle 22 is illustrated wherein the handle includes a receptacle for receiving a cylindrical member 60 from which a threaded shank protrudes as identified by numeral 21. The threaded shank is employed to open or close a slot 62 on the C-clamp 17 so as to loosen or restrict movement of the double C-clamp. This clamping means is identical to the clamp indicated on the end of the flange 16 and operated by handle 21. A spring 63 is provided between a fastener head 64 and the spring 23 provides a smooth turning of the handle 22 so that the handle will move in the direction of the arrow 65 to open or close the slot 62.

In FIG. 6, it can be seen that the support rods 23 and 24 may be moved relative to one another which causes the upper or top cross member 20 to be disposed at an angular disposition with respect to horizontal. This movement and the extent of movement is under control of the locking mechanism 26 and can be achieved when the locking mechanism is loose or untightened. Again, such movement permits further articulation and positioning of the platform 11.

FIG. 7 augments FIG. 6 by diagrammatically illustrating the lateral positioning of the support rods 23 and 24 and indicated by broken lines to alternative positions when the locking mechanism 26 is released.

The present invention is intended to support the weight of a hand-held video camera or other equipment while allowing for freedom of movement. The strap can be worn over the shoulder or around the neck and is attached to plastic pieces or plates worn just above the hip. The plates are on one side of a parallelogram which mounts a top piece to move side-to-side but stay parallel to the ground. A clamp on the end of the top piece allows the equipment, such as the camera, to "tilt" when the clamp is loose or to be locked in position. The second clamp attaches to the first and allows the equipment, such as the camera, to "pan" when the clamp is loosened or held in position when locked. The present invention provides more stable hand-held "shots" and more fluid moving "shots" than conventional hand-holding supports. The invention provides relief for the user's arms and shoulders during long periods of use. The strap is composed of nylon and/or leather and the moving parts are fabricated from aluminum and acetyl homopolymer (plastic). The hardware also includes stainless steel pins, brass thumb screws, and plastic adjustable clamping handles.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An articulated equipment support comprising:
   a plurality of substantially vertically-oriented, elongated support bars having opposite ends;
   a top cross rod movably carried on one pair of ends of said opposite ends;
   a bottom cross rod movably carried on the other pair of ends of said opposite ends, said top and bottom cross rods being substantially parallel and horizontally oriented;
   a double C-clamp mounted on said top cross rod;
   a platform secured to said double C-clamp for supporting equipment;
   movable connections coupling said top cross rod and said bottom cross rod permitting pivotal and lateral movement of said platform so that a variety of geometric configurations are established; and
   a shoulder strap pivotally coupled to said bottom cross rod adapted to be worn and supported on the torso of the user whereby substantially hands-free support of the equipment is provided during an equipment operating procedure.

2. The equipment support defined in claim 1 wherein:
   said double C-clamp is mounted on said top cross rod for rotation about a horizontal and vertical axis.

3. The equipment support defined in claim 2 including:
   manually operated lock means carried on said double C-clamp and on said top cross rod for releasably retaining said double C-clamp and said top cross rod in a fixed position with respect to said support bars.

4. The equipment defined in claim 1 including:
   manually operated securement means carried on said top cross rod and said C-clamp for releasably retaining said platform in a fixed position with respect to said support bars.

5. The equipment defined in claim 4 including:
   an equipment securement fastener mounted on said platform for releasably securing equipment on said platform.

6. The equipment defined in claim 5 wherein:
   a selected end of said top cross rod includes a reduced portion serving as a bearing for rotatably mounting said C-clamp.

7. The equipment defined in claim 6 wherein;
   said C-clamp includes a bore receiving said reduced portion and is rotatable thereon when said securement means on said C-clamp is in a released condition.

8. An articulated equipment support comprising:
   a top cross rod;
   a bottom cross rod, said top and bottom cross rods being substantially parallel and horizontally oriented;
   a plurality of substantially vertically oriented, elongated support bars having opposite ends movably attached to said top cross rod and said bottom cross rod respectively;
   a pivot connection joining said support bars to said top cross rod;
   a rotatable connection joining said support bars to said top cross rod;
   an equipment platform for releasably supporting a sound and visual recording apparatus;
   mounting means disposed between and movably coupling said platform and said top cross rod; and
   a shoulder strap means pivotally coupled to said bottom cross rod for deployment on the torso of the user permitting substantially hands-free support for said sound and visual recording apparatus.

9. The equipment support defined in claim 8 wherein:
   said mounting means is a clamp having a bore insertably receiving said top cross rod allowing rotary movement thereon about a horizontal axis; and
   fastener means fixedly securing said clamp to said platform whereby said platform follows movement of said clamp.

10. The equipment support defined in claim 9 wherein:
    said sound and visual recording apparatus is adapted to move about a first horizontal axis via said clamp and rotatable about a vertical axis via said rotatable connection and pivotal about a second horizontal axis which is normal to said first horizontal axis via said pivot connection.

* * * * *